United States Patent [19]
Lee et al.

[11] Patent Number: 6,071,014
[45] Date of Patent: Jun. 6, 2000

[54] SPINDLE MOTOR WITH HYBRID AIR/OIL HYDRODYNAMIC BEARING

[75] Inventors: Chen-Hsiung Lee; James Francis Sullivan, both of San Jose, Calif.

[73] Assignee: International Business Machines Corporation, Armonk, N.Y.

[21] Appl. No.: 09/222,857

[22] Filed: Dec. 30, 1998

[51] Int. Cl.$^7$ ................................................ F16C 32/06
[52] U.S. Cl. ......................................... 384/107; 384/100
[58] Field of Search .................... 384/100, 107, 384/112

[56] References Cited

U.S. PATENT DOCUMENTS

| | | | |
|---|---|---|---|
| 4,200,344 | 4/1980 | Binns et al. | |
| 4,573,807 | 3/1986 | Asada et al. | 384/100 |
| 5,112,141 | 5/1992 | Asada et al. | 384/100 |
| 5,358,339 | 10/1994 | Konno et al. | 384/107 |
| 5,504,637 | 4/1996 | Asada et al. | 384/107 X |
| 5,516,212 | 5/1996 | Titcomb | 384/107 |
| 5,664,889 | 9/1997 | Gustafson | 384/114 |
| 5,707,154 | 1/1998 | Ichiyama | 384/107 |
| 5,770,906 | 6/1998 | Hazelton et al. | 310/90 |
| 5,839,833 | 11/1998 | Zang | 384/107 |
| 5,847,479 | 12/1998 | Wang et al. | 384/112 X |

FOREIGN PATENT DOCUMENTS

| | | |
|---|---|---|
| 60-143222 | 7/1985 | Japan . |
| 3-28517 | 2/1991 | Japan . |
| 3-60349 | 3/1991 | Japan . |
| 3-66915 | 3/1991 | Japan . |
| 3-255214 | 11/1991 | Japan . |
| 8-163819 | 6/1996 | Japan . |

*Primary Examiner*—Thomas R. Hannon
*Attorney, Agent, or Firm*—Altera Law Group, LLC

[57] ABSTRACT

The present disclosure relates to a spindle motor including a shaft having an outer circumferential surface. The spindle motor also includes a thrust plate fixedly connected to the shaft. The thrust plate projects radially outward from the outer circumferential surface of the shaft and includes top and bottom surfaces. The spindle motor also includes a hub assembly mounted on the shaft. The hub assembly is adapted for mounting a storage disk. The spindle motor further includes a liquid hydrodynamic bearing and an aerodynamic bearing. The liquid hydrodynamic bearing is formed along the top and bottom surfaces of the thrust plate and is adapted for transferring loads in an axial direction relative to the shaft. The aerodynamic bearing is formed along a portion of the hub assembly and is adapted for transferring loads in a radial direction relative to the shaft.

21 Claims, 8 Drawing Sheets

SPINDLE MOTOR WITH HYBRID AIR/OIL HYDRODYNAMIC BEARING

BACKGROUND OF THE INVENTION

1. Field of the Invention

This invention relates in general to spindle motors for use in magnetic disc storage systems. More particularly, this invention relates to magnetic disc storage systems having spindle motors that use hydrodynamic bearings.

2. Description of Related Art

Data storage systems, such as disk drives, commonly make use of rotating storage disks. The storage disks are commonly magnetic disks but could also be optical. In a typical magnetic disk drive, a magnetic disk rotates at high speed and a transducing head uses air pressure to "fly" over the top surface of the disk. The transducing head records information on the disk surface by impressing a magnetic field on the disk. Information is read back using the head by detecting magnetization of the disk surface. The magnetic disk surface is divided in a plurality of concentric tracks. By moving the transducing head radially across the surface of the disk, the transducing head can read information from or write information to different tracks of the magnetic disk.

Spindle motors are commonly used to rotate magnetic disks at high speeds. Frequently, conventional spindle motors comprise small electric motors equipped with standard ball bearings. However, electric motors having ball bearings are known to experience problems such as runout or vibration that can prevent information from being accessed from disks rotated by the motors. This is especially true as advancements in data storage technology have increased magnetic disk storage densities. To overcome the problems associated with ball bearing electric motors, some disk drive systems now make use of electric motors having fluid hydrodynamic bearings. Bearings of this type are shown in U.S. Pat. No. 5,427,546 to Hensel, U.S. Pat. No. 5,516,212 to Titcomb and U.S. Pat. No. 5,707,154 to Ichiyama.

An exemplary hydrodynamic bearing typically includes a stationary shaft on which is mounted a rotary hub to which magnetic disks can be secured. There is no direct contact between the rotating hub and the shaft. Instead, a lubricating fluid such as air or oil forms a hydrodynamic bearing between the shaft and the rotary hub. Hydrodynamic pressure or pumping is frequently provided by a pattern of grooves, commonly in a herringbone configuration, defined either by the exterior surface of the shaft or the interior surface of the rotary hub. During rotation of the hub, the pattern of grooves provides sufficient hydrodynamic pressure to cause the lubricating fluid to act as a bearing between the shaft and the rotary hub. Frequently, capillary seals are used to retain the bearing fluid between the shaft and the rotary hub.

When used in association with spindle motors, air bearings provide numerous advantages. For example, air bearings are more efficient and consume less power than either ball bearings or oil bearings. Also, air bearings are quiet and have excellent run out characteristics. Air bearings also have disadvantages. For example, when air bearings are used in disk drive spindle motors, it can be difficult or expensive to simultaneously provide both thrust (e.g. axial) and journal (e.g. radial) bearing support. Also, sliding friction associated with thrust operations during motor start-up and shut-down can create wear debris that reduces the efficiency of the motor. Additionally, air bearings often require more space than either ball or oil bearings thereby providing less space for the motor. Finally, air bearings are typically not effective for low rotational speed applications.

Oil bearings also have advantages when applied to disk drive spindle motors. For example, oil bearings are generally quiet and have good run out characteristics. Also, oil bearings occupy less space than either ball bearings or air bearings. However, oil bearings also have disadvantages. For example, oil bearings consume more power than ball bearings or air bearings. Furthermore, when oil bearings are used in the journal bearing environment, oil leakage can be problematic.

In the future, spindle motor disk rotation speeds will steadily increase. As disk rotation speeds increase, the problems associated with standard oil bearings, air bearings and ball bearings will become magnified. Increased disk recording density is another trend in the industry. The combination of increased disk rotation speeds and increased recording densities will require disk drives to operate with improved run out characteristics. What is needed is a disk drive bearing system that has excellent run out characteristics, that demonstrates long life even when used at high rotational speeds, that eliminates oil leaks, that reduces wear and friction, that generates power savings, and that is relatively efficient to manufacture.

SUMMARY OF THE INVENTION

One aspect of the present invention relates to a spindle motor having a shaft including an outer circumferential surface. A thrust plate is fixedly connected to the shaft. The thrust plate projects radially outward from the outer circumferential surface of the shaft and includes oppositely facing top and bottom surfaces. The spindle motor also includes a hub assembly mounted on the shaft. The hub assembly is adapted for mounting a storage disk. The spindle motor further includes a liquid hydrodynamic bearing and an aerodynamic bearing. The liquid hydrodynamic bearing is formed along the top and bottom surfaces of the thrust plate and is adapted for transferring loads in an axial direction relative to the shaft. The aerodynamic bearing is formed along a portion of the hub assembly and is adapted for transferring loads in a radial direction relative to the shaft.

Another aspect of the present invention relates to a spindle motor as described above that is incorporated within a data storage system.

These and various other advantages and features of novelty that characterize the invention are pointed out with particularity in the claims annexed hereto and form a part hereof. However, for a better understanding of the invention, its advantages, and the objects obtained by its use, reference should be made to the drawings that form a further part hereof, and to accompanying descriptive matter, in which there are illustrated and described specific examples of apparatuses in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiments, reference is made to the accompanying drawings that form a part hereof, and in which are shown by way of illustration specific non-limiting embodiments in which the invention may be practiced. It is to be understood that other embodiments may be utilized as structural changes may be made without departing from the scope of the present invention. For ease of description, orientational or directional phrases such as "top" and "bottom" are used throughout the specification. However, it will be appreciated that the various embodiments disclosed in this specification can be used in different orientations than those specifically shown.

Figure 1:
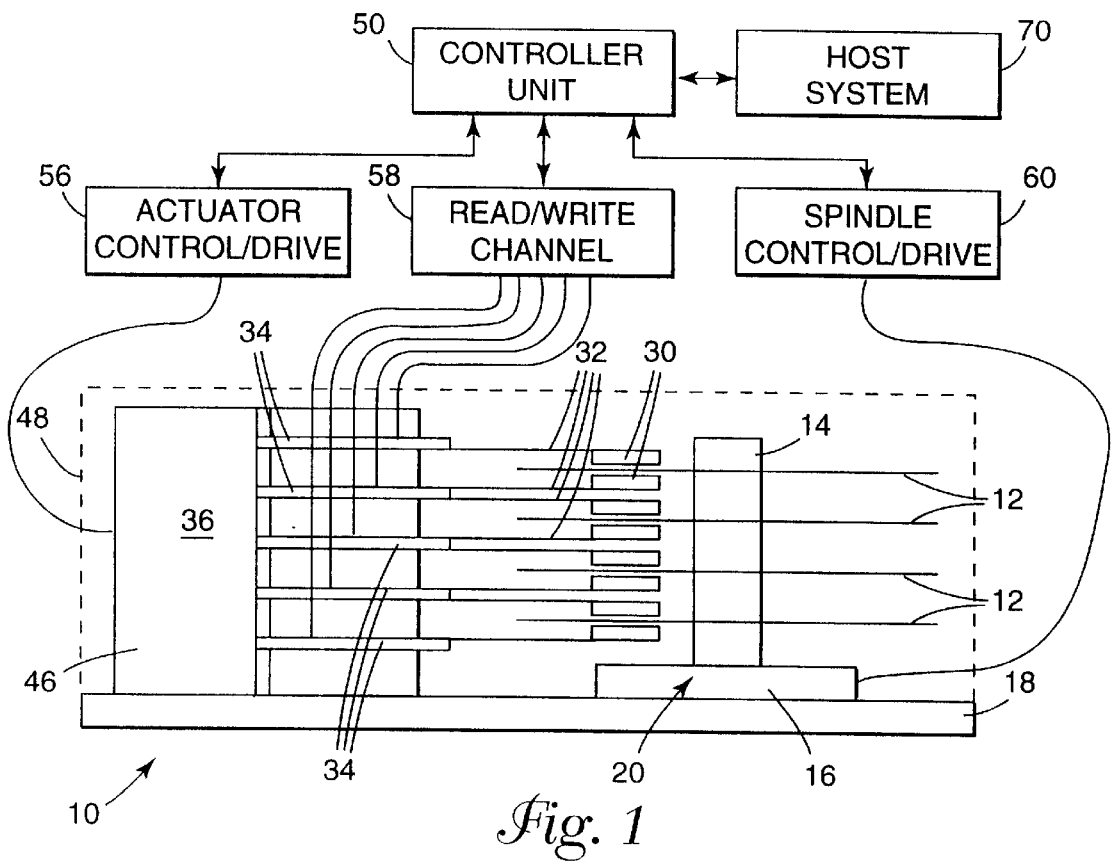
FIG. 1 is a schematic diagram of a data storage system.
Figure 2:
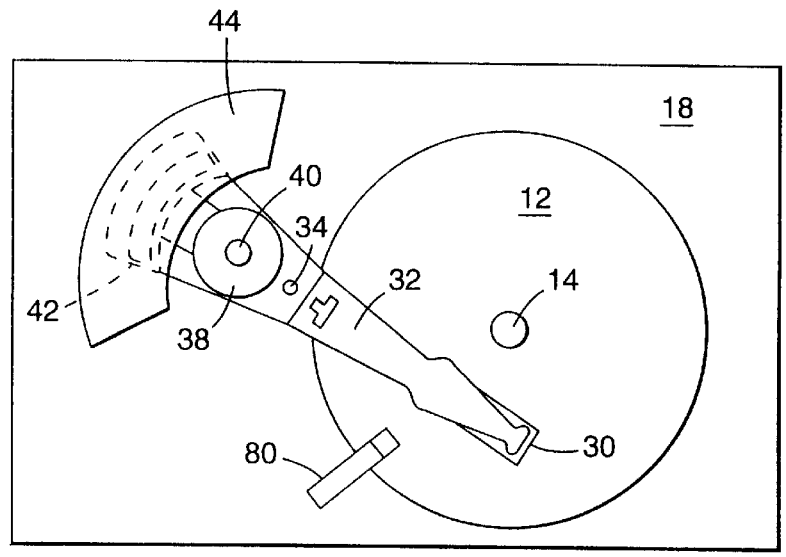
FIG. 2 is a top view of the system of FIG. 1.

FIGS. 1 and 2 schematically show a data storage system 10 suitable for practicing the present invention. The system 10 includes a plurality of magnetic recording disks 12. Each disk 12 has a plurality of concentric data tracks. The disks 12 are mounted on a spindle 14 which is connected to a spindle motor 16. The motor 16 is mounted to a chassis 18. The disks 12, spindle 14, and motor 16 form a disk stack assembly 20.

A plurality of sliders 30 having read/write heads are positioned over the disks 12 such that each of the disks 12 has a corresponding slider 30. Each slider 30 is attached to one of the plurality of suspensions 32 which in turn are attached to a plurality of actuator arms 34. The arms 34 are connected to a rotary actuator 36. Alternatively, the arms 34 may be an integral part of a rotary actuator comb. The actuator 36 moves the heads in a radial direction across the disks 12. The actuator 36 typically comprises a rotating member 38 mounted to a rotating bearing 40, a motor winding 42 and motor magnets 44. The actuator 36 is also mounted to the chassis 18. Although a rotary actuator is shown in the preferred embodiment, a linear actuator could also be used. The sliders 30, suspensions 32, arms 34, and actuator 36 form an actuator assembly 46. The disk stack assembly 20 and the actuator assembly 46 are sealed in an enclosure 48 (shown by dashed line) which provides protection from particulate contamination.

A controller unit 50 provides overall control to the system 10. The controller unit 50 typically contains a central processing unit (CPU), memory unit and other digital circuitry. The controller 50 is connected to an actuator control/drive unit 56 which in turn is connected to the actuator 36. This allows the controller 50 to control the movement of the sliders 30 over the disks 12. The controller 50 is also connected to a read/write channel 58 which in turn is connected to the heads of the sliders 30. This allows the controller 50 to send and receive data from the disks 12. The controller 50 is further connected to a spindle control/drive unit 60 which in turn is connected to the spindle motor 16. This allows the controller 50 to control the rotation of the disks 12. A host system 70, which is typically a computer system, is connected to the controller unit 50. The host system 70 may send digital data to the controller 50 to be stored on the disks 12, or may request that digital data be read from the disks 12 and sent to the system 70. The basic operation of DASD units is well known in the art and is described in more detail in *Magnetic Recording Handbook* C. Dennis Mee and Eric D. Daniel, McGraw Hill Book Company, 1990.

Figure 3:
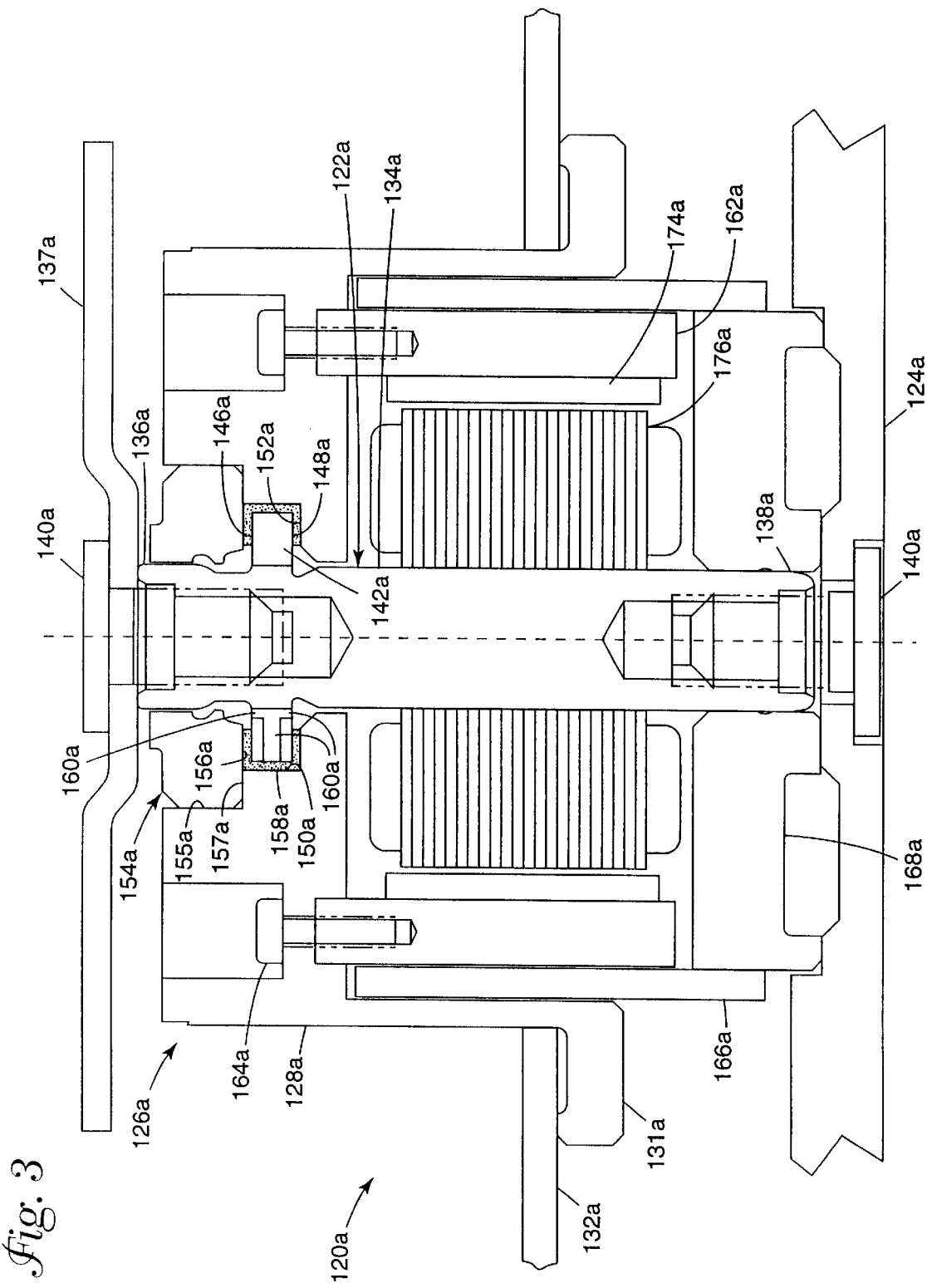
FIG. 3 is a cross-sectional view bisecting a first embodiment of a spindle motor constructed in accordance with the principles of the present invention.

FIG. 3 is diagramatic cross-sectional view of a spindle motor 120a that is an embodiment of the present invention. A preferred application of the spindle motor is in data storage systems such as the disk drive system 10 illustrated in FIGS. 1 and 2.

Referring to FIG. 3, the spindle motor 120a includes a shaft 122a that is fixed relative to a base plate 124a. A hub assembly 126a is rotatably mounted on the shaft 122a. The hub assembly 126a includes a main hub 128a. A circumferential flange 131a projects radially outward from the main hub 128a. The circumferential flange 131a is adapted for securing a data storage disk 132a (e.g., a magnetic or optical disk) to the main hub 128a.

The shaft 122a of the spindle motor 120a is generally cylindrical and includes a circumferential outer surface 134a. A top end 136a of the shaft 122a is positioned adjacent a cover 137a of the spindle motor 120a, while a bottom end 138a of the shaft 122a is positioned adjacent the base plate 124a. The top and bottom ends 136a and 138a of the shaft 122a are respectively connected to the cover 137a and the base plate 124a by fasteners such as bolts or screws 140a.

Referring still to FIG. 3, a generally annular thrust plate 142a is fixably connected to the shaft 122a. As shown in FIG. 3, the shaft 122a and the thrust plate 142a are constructed from different components. However, it will be appreciated that in alternative embodiments, the shaft 122a and the thrust plate 142a can be unitarily constructed as a single integral piece.

The thrust plate 142a projects radially outward from the circumferential outer surface 134a of the shaft 122a. The thrust plate 142a includes substantially parallel top and bottom sides 146a and 148a. The thrust plate 142a is mounted within a first annular recess 150a defined within the top of the main hub 128a. As mounted in the first annular recess 150a, the bottom side 148a opposes a first radial shoulder 152a of the main hub 128a.

A containment plate 154a is mounted on the shaft 122a and is fixedly connected to the main hub 128a. The containment plate 154a is generally annular and the shaft 122a extends through a central opening of the containment plate 154a. The containment plate 154a is positioned directly above the thrust plate 142a and includes a fluid containment surface 156a that faces downwardly and opposes the top side 146a of the thrust plate 142a. The containment plate 154a is mounted in a second annular recess 155a defined in the top of the main hub 128a. When mounted within the second annular recess 155a, the fluid containment surface 156a of the containment plate 154a abuts against a second radial shoulder 157a defined by the main hub 128a.

The spindle motor 120a includes a liquid hydrodynamic bearing for supporting load applied in an axial direction relative to the shaft 122a. For example, a liquid such as grease or oil 158a is filled between the thrust plate 142a, the main hub 128a and the containment plate 154a. Preferably, a spacing gap of about 10 microns exists between the thrust plate 142a and the main hub 128a, and between the thrust plate 142a and the containment plate 154a. Porting holes 160a are defined through the thrust plate 142a for allowing air to escape when the oil 158a is pressurized.

Figure 4:
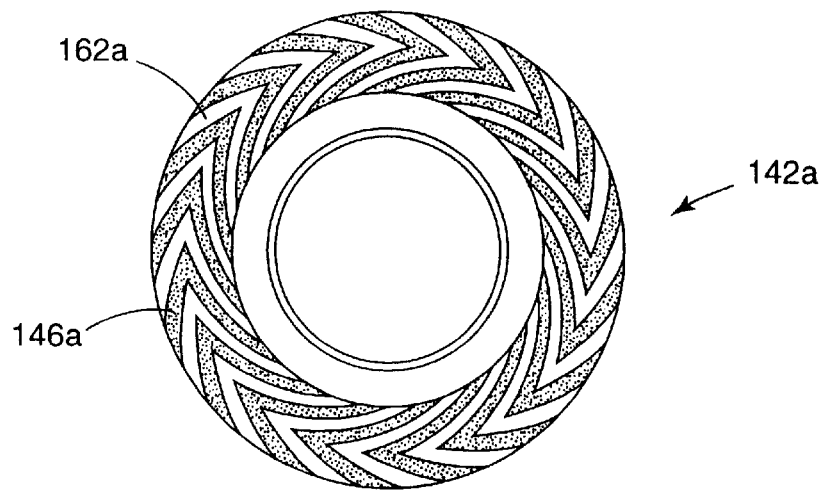
FIG. 4 is a top plan of a thrust plate suitable for use with the spindle motor of FIG. 3.

The spindle motor 120a preferably includes structure for pressurizing the oil 158a when the main hub 128a is rotated relative to the shaft 122a. For example, the top and bottom sides 146a and 148a of the thrust plate 142a can define a pattern of grooves adapted for pumping the oil 158a radially outward relative to the shaft 122a when the main hub 128a is rotated. An exemplary herringbone pattern 162a is shown in FIG. 4. It will be appreciated that similar patterns can also be formed on the fluid containment surface 156a of the containment plate 154a and the first radial shoulder 152a of the main hub 128a to achieve a similar result.

As described below, the spindle motor 120a preferably uses an aerodynamic bearing as a radial or journal bearing. The radial bearing is adapted for transferring loads in a radial direction relative to the shaft 122a.

Referring again to FIG. 3, the hub assembly 126a includes a hub sleeve 162a connected to the main hub 128a by fasteners 164a such as bolts, screws or adhesives. The hub sleeve 162a is generally annular and is concentrically mounted with respect to the shaft 122a. A stationary sleeve 166a is mounted directly outside the hub sleeve 162a. The stationary sleeve 166a is generally annular and is also generally concentric with respect to the shaft 122a. A lower portion of the stationary sleeve 166a is fixedly connected to a support member 168a that is fixedly connected to the shaft 122a. The stationary sleeve 166a is preferably mounted between the flange 131a and the hub sleeve 162a.

An aerodynamic bearing is preferably formed between the hub sleeve 162a and the stationary sleeve 166a. A preferred spacing gap between the hub sleeve 162a and the stationary sleeve 166a is about 2 microns. The spindle motor 120a preferably includes structure for generating air pressure between the hub sleeve 162a and the stationary sleeve 166a such that the air bearing is generated. For example, a pattern of grooves configured for pumping air can be defined by either the outer surface of the hub sleeve 162a or the inner surface of the stationary sleeve 166a.

Figure 5:
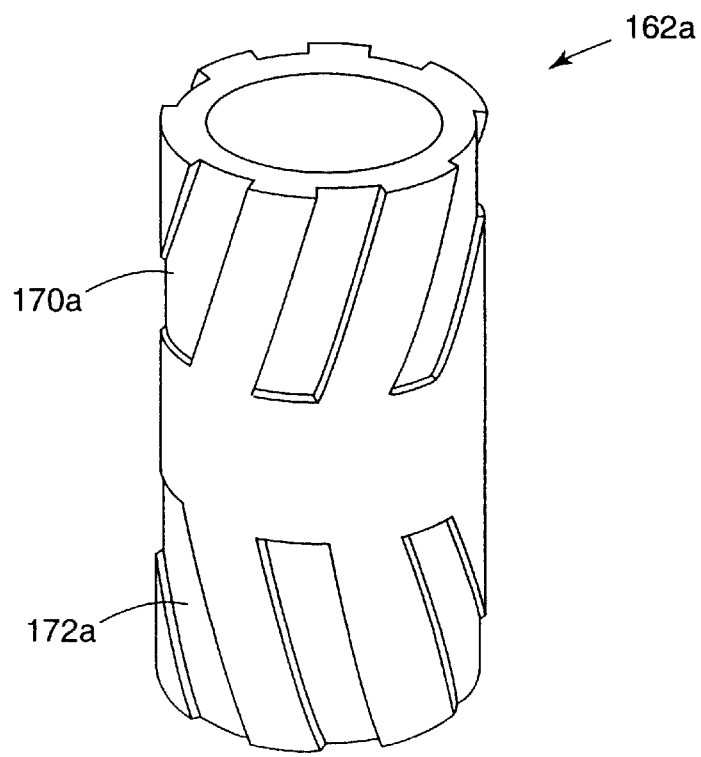
FIG. 5 is a perspective view of a hub sleeve suitable for use with the spindle motor of FIG. 3.

FIG. 5 shows one particular groove pattern that is formed on the outer surface of the hub sleeve 162a. The groove pattern of FIG. 5 includes an upper set of grooves 170a and a lower set of grooves 172a. The upper and lower sets of grooves 170a and 172a are arranged generally in a herringbone configuration. The upper set of grooves 170a is adapted to pump air in a downward direction while the lower set of grooves 172a is adapted to pump air in an upward direction. The lengths of the upper and lower sets of grooves 170a and 172a are selected to make the upward and downward pumping tendency equal or balanced.

Referring back to FIG. 3, the spindle motor 120a further includes a generally annular magnet 174a secured to the inside of the hub sleeve 162a. The magnet 174a surrounds a stator 176a that is fixed to the shaft 122a.

In use of the spindle motor 120a, load in an axial direction relative to the shaft 122a is supported by the liquid hydrodynamic bearing formed between the containment plate 154a, the thrust plate 142a and the main hub 128a. In contrast, load in a radial direction relative to the shaft 122a is supported by the aerodynamic bearing formed between the hub sleeve 162a of the hub assembly 126a and the stationary sleeve 166a secured to the shaft 122a.

Figure 6:
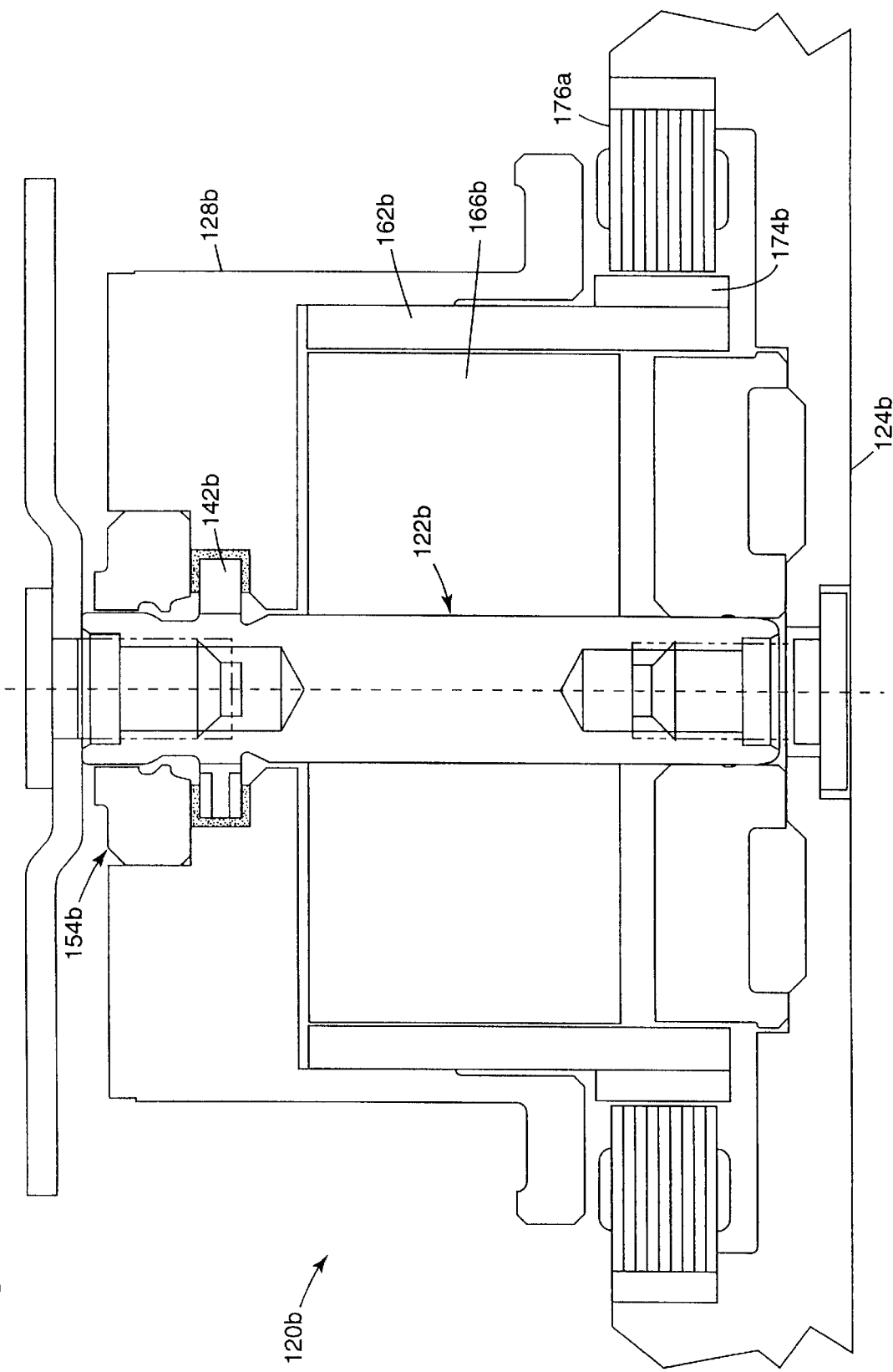
FIG. 6 is a cross-sectional view bisecting a second embodiment of a spindle motor constructed in accordance with the principles of the present invention.

FIG. 6 illustrates a spindle motor 120b that is a second embodiment of the present invention. The spindle motor 120b includes a fixed shaft 122b and a main hub 128b rotatably mounted on the fixed shaft 122b. The spindle motor 120b also includes a containment plate 154b and a thrust plate 142b that cooperate with the main hub 128b to form a liquid hydrodynamic bearing that is identical to the liquid hydrodynamic bearing described with respect to the spindle motor 120a of FIG. 3.

The spindle motor 120b has been modified to include a different aerodynamic bearing configuration as compared to the spindle motor 120a of FIG. 3. For example, the spindle motor 120b includes a stationary sleeve 166b that is generally annular and is fixedly connected directly to the shaft 122b. An annular hub sleeve 162b is fixedly connected to the main hub 128b. The hub sleeve 162b is positioned outside the stationary sleeve 166b. Both the stationary sleeve 166b and the hub sleeve 162b are concentric with respect to the shaft 122b. An annular magnet 174b is connected to an outer surface of the hub sleeve 162b. The magnet 174b is surrounded by an annular stator 176b that is connected to a base plate 124b of the spindle motor 120b.

Either the outer surface of the stationary sleeve 166b or the inner surface of the hub sleeve 162b defines a pattern of grooves adapted for pumping air between the hub sleeve 162b and the stationary sleeve 166b when the main hub 128b is rotated relative to the shaft 122b. The pumping action is adapted for generating an aerodynamic bearing between the hub sleeve 162b and the stationary sleeve 166b.

Figure 7:
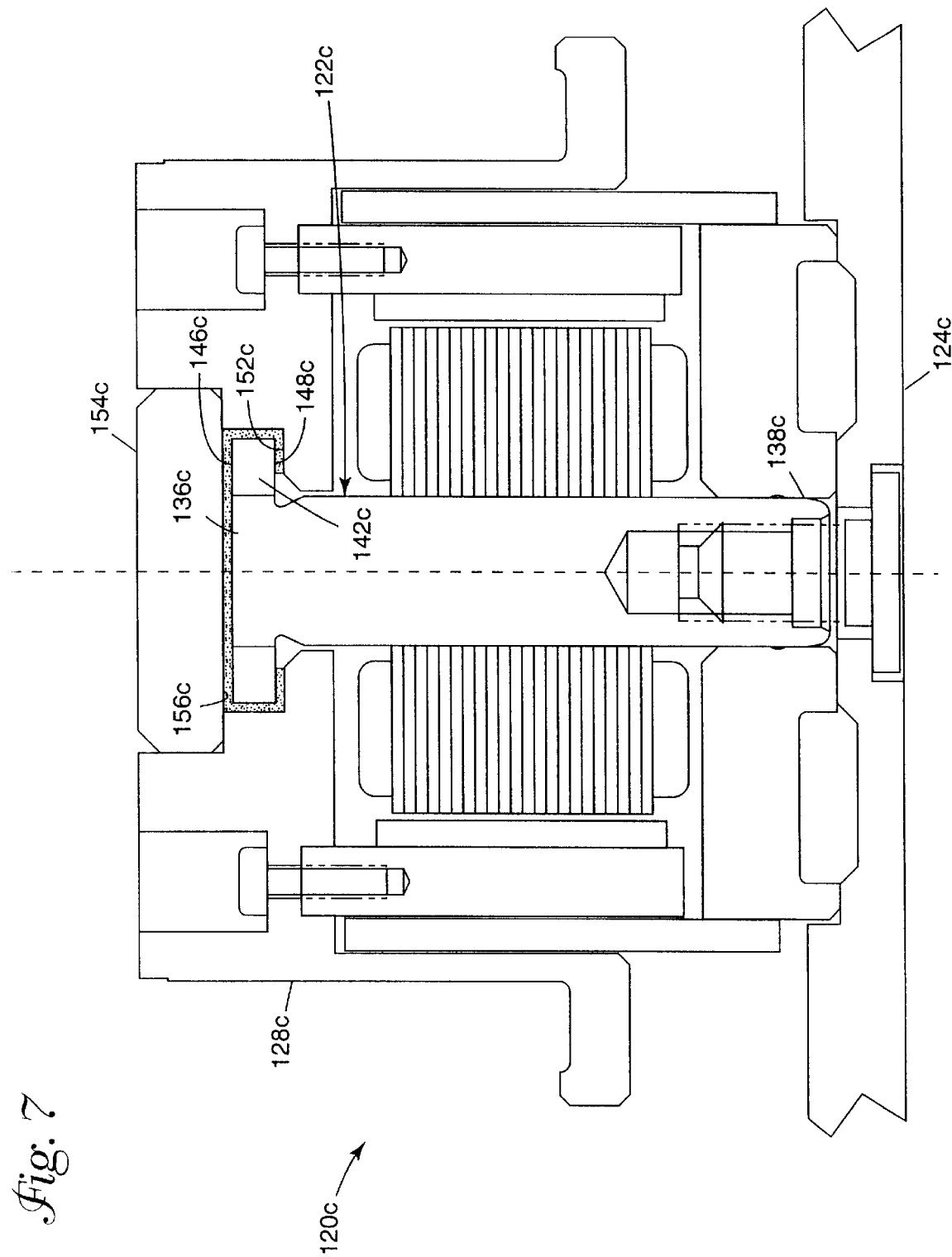
FIG. 7 is a cross-sectional view bisecting a third embodiment of a spindle motor constructed in accordance with the principles of the present invention.

FIG. 7 illustrates a spindle motor 120c having a modified thrust bearing configuration as compared to the spindle motor 120a of FIG. 3. The spindle motor 120c includes a fixed shaft 122c on which a main hub 128c is rotatably mounted. The shaft 122c includes a bottom end 138c connected to a base plate 124c, and a top end 136c positioned directly beneath a containment plate 154c. The containment plate 154c has a generally solid, disk-shaped configuration and is fixedly connected to the main hub 128c. A fluid containment surface 156c of the containment plate 154c faces the top end 136c of the shaft 122c. A thrust plate 142c is fixedly connected to the top end 136c of the shaft 122c. The thrust plate 142c projects radially outward from the shaft 122c and includes a top side 146c that faces the fluid containment surface 156c of the containment plate 154c, and a bottom side 148c that faces a radial shoulder 152c of the main hub 128c. A lubricant such as oil or grease is filled between the containment plate 154c, the thrust plate 142c and the main hub 128c. In certain embodiments, the top and bottom sides 146c and 148c of the thrust plate 142c define a pattern of grooves configured for pressurizing the lubricant when the main hub 128c is rotated relative to the shaft 122c. In other embodiments, a similar groove configuration can be formed on the containment plate 154c and the radial shoulder 152c to achieve a similar result. In this manner, the main hub 128c, the thrust plate 142c, the containment plate 154c and the lubricant cooperate to provide a liquid hydrodynamic thrust bearing.

Figure 8:
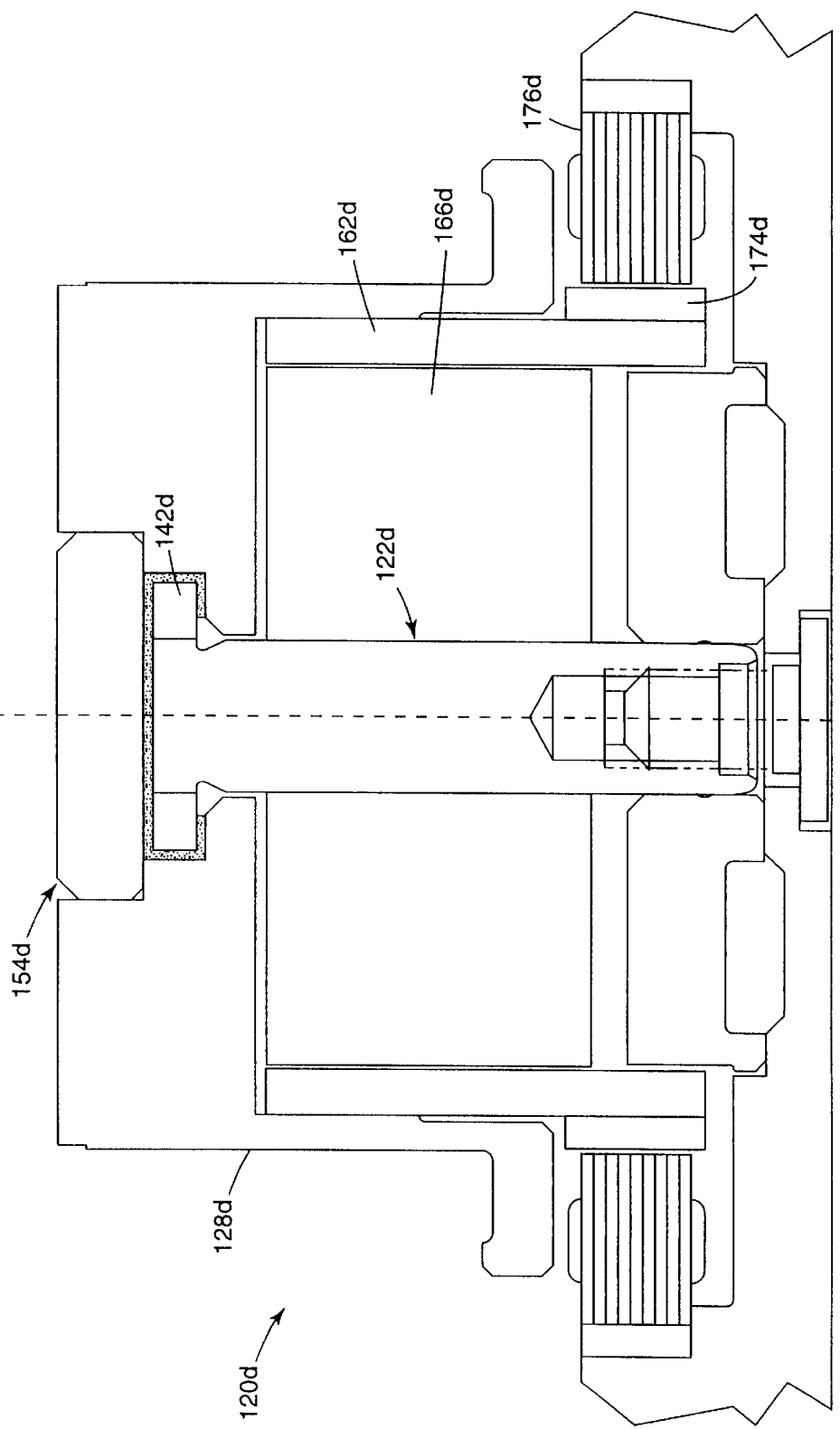
FIG. 8 is a cross-sectional view bisecting a fourth embodiment of a spindle motor constructed in accordance with the principles of the present invention.

FIG. 8 shows a spindle motor 120d that is a fourth embodiment of the present invention. The spindle motor 120d includes a shaft 122d, a thrust plate 142d and a containment plate 154d that are arranged in the same configuration as the shaft 122c, the thrust plate 142c and the containment plate 154c of FIG. 7. Additionally, the spindle motor 120d includes a main hub 128d, a stationary sleeve 166d, a hub sleeve 162d, a magnet 174d and a stator 176d that are arranged in the same configuration as the corresponding components of the spindle motor 120b of FIG. 6.

Figure 9:
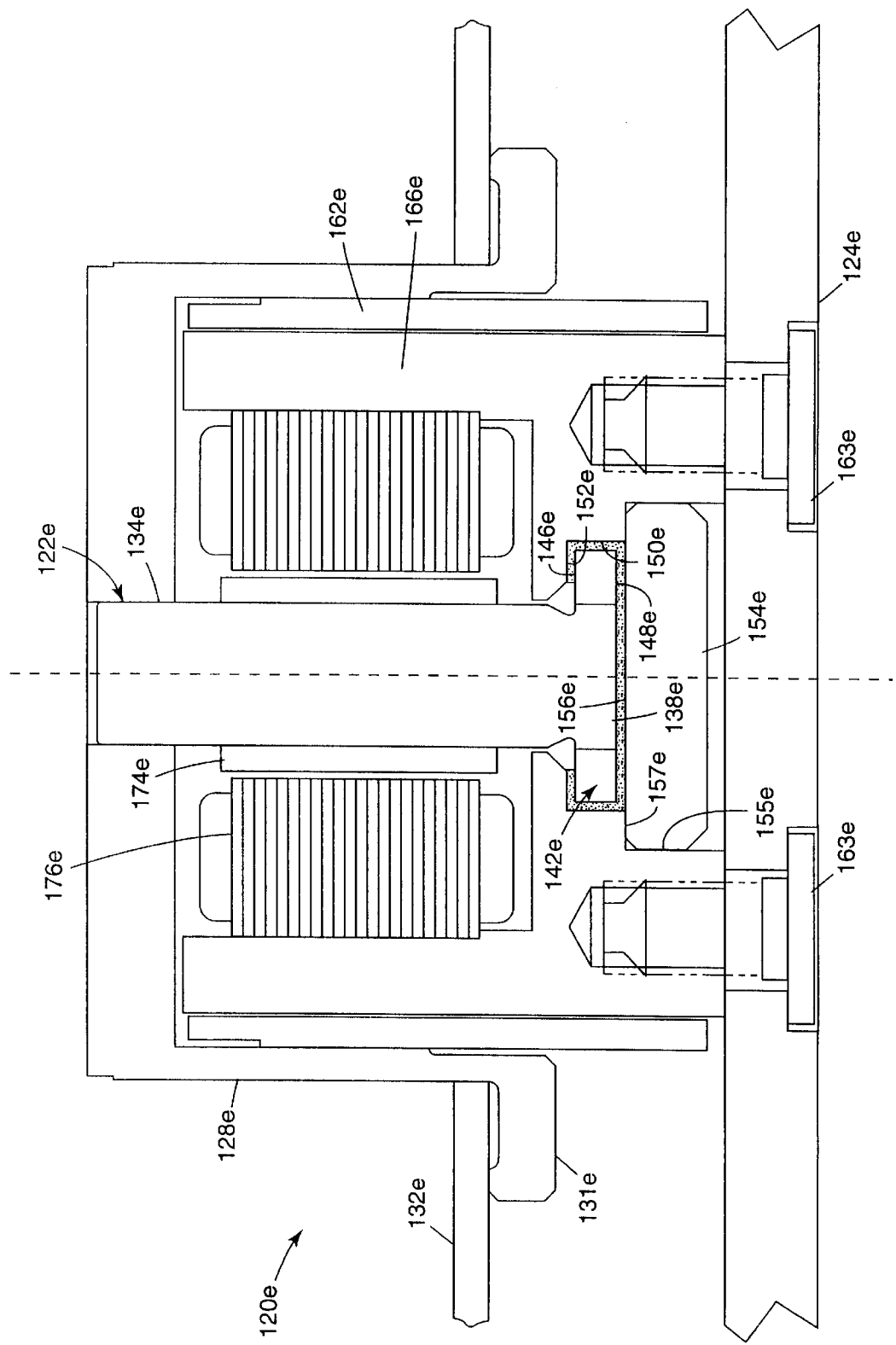
FIG. 9 is a cross-sectional view bisecting a fifth embodiment of a spindle motor constructed in accordance with the principles of the present invention.

FIG. 9 illustrates a fifth spindle motor 120e constructed in accordance with the principles of the present invention. The spindle motor 120e includes a rotatable shaft 122e that is free to rotate relative to a base plate 124e. A main hub 128e is fixedly connected to a top end of the shaft 122e. A flange 131e for mounting a storage disk 132e projects radially outward from the main hub 128e.

A stationary sleeve 166e is fixedly connected to the base plate 124e by suitable fasteners 163e. The stationary sleeve 166e is generally concentric with respect to the shaft 122e. A bottom side of the stationary sleeve 166e defines a first annular recess 150e for receiving a thrust plate 142e, and a second annular recess 155e for receiving a containment plate 154e. The thrust plate 142e is fixedly connected to a bottom end 138e of the shaft 122e. The thrust plate 142e projects radially outward from an outer circumferential surface 134e of the shaft 122e and includes substantially parallel top and bottom sides 146e and 148e. The top side 146e of the thrust plate 142e faces a first radial shoulder 152e of the stationary sleeve 166e. The bottom side 148e of the thrust plate 142e faces a fluid containment surface 156e of the containment plate 154e. The containment plate 154e is fixedly connected to the stationary sleeve 166e, and the fluid containment surface 156e engages a second radial shoulder 157e of the stationary sleeve 166e. A liquid lubricant such as oil or grease is filled between the stationary sleeve 166e, the thrust plate 142e and the containment plate 154e. When the shaft 122e is rotated, the lubricant is pressurized (e.g., by a pattern of grooves as previously described) to provide a liquid hydrodynamic bearing for transferring loads in an axial direction relative to the shaft 122e.

The spindle motor 120e also includes a hub sleeve 162e fixedly connected to the main hub 128e. The hub sleeve 162e is generally annular and includes an inner surface that faces a corresponding outer surface of the stationary sleeve 166e. The hub sleeve 162e and the stationary sleeve 166e are configured to provide an air journal bearing when the hub 128e is rotated. For example, either the inner surface of the hub sleeve 162e or the outer surface of the stationary sleeve 166e can have a herringbone pattern of grooves for pumping air as previously described in the specification. The spindle motor 120e further includes an annular magnet 174e fastened to the shaft 122e, and a stator 176e that surrounds the magnet 174e. The magnet 174e and the stator 176e are positioned within an inner chamber defined by the stationary sleeve 166e. The stator 176e is fixedly connected to the sleeve 166e.

Figure 10:
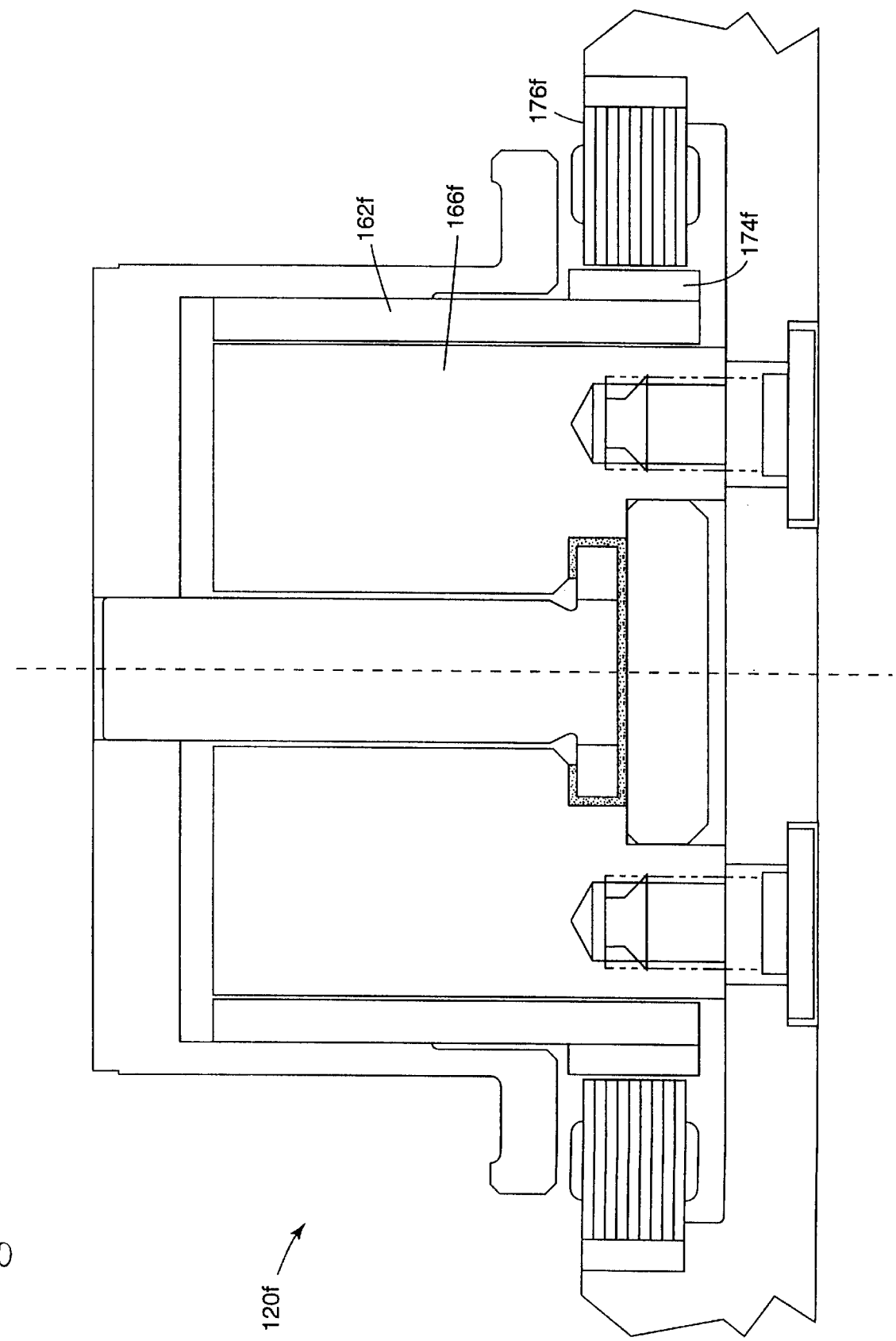
FIG. 10 is a cross-sectional view bisecting a sixth embodiment of a spindle motor constructed in accordance with the principles of the present invention.

FIG. 10 illustrates a sixth embodiment of a spindle motor 120f constructed in accordance with the principles of the present invention. The spindle motor 120f has substantially the same thrust bearing configuration as the liquid hydrodynamic thrust bearing described with respect to FIG. 9. However, the spindle motor 120f of FIG. 10 includes a stationary sleeve 166f that does not have an internal chamber for housing a stator or a magnet. Instead, a magnet 174f is mounted on the outside of a hub sleeve 162f. Additionally, a stator 176f is mounted outside the magnet 174f. Preferably, an air journal bearing is formed between an inner surface of the hub sleeve 162f and an outer surface of the stationary sleeve 166f.

The various aspects of the present invention provide numerous advantages. For example, the use of an air journal bearing provides reduced motor drag as compared to spindle motors having oil journal bearings. The use of air journal bearings also eliminates the oil leakage problem commonly associated with oil journal bearings. Furthermore, the use of a liquid thrust bearing assists in reducing frictional wear associated with starting and stopping operations, and also eliminates the precise tolerances associated with air thrust bearings. Moreover, the various embodiments of the present invention can be efficiently and cost effectively manufactured. Additionally, the configurations of the thrust and journal bearings provide for spindle motors that can be efficiently operated at various different orientations. For example, the embodiments can be effectively operated right-side-up, upside-down, or angled relative to horizontal.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A spindle motor comprising:
    a shaft having an outer circumferential surface;
    a stationary sleeve concentrically positioned about the shaft;
    a hub assembly including a hub mounted on the shaft, the hub being rotatable relative to the stationary sleeve, the hub being adapted for mounting a storage disc, and the hub assembly including a hub sleeve connected to the hub;
    a thrust plate fixedly connected to the shaft, the thrust plate projecting radially outward from the outer circumferential surface of the shaft;
    a liquid hydrodynamic bearing formed adjacent the thrust plate for transferring loads in an axial direction relative to the shaft; and
    an aerodynamic bearing formed between the stationary sleeve and the hub sleeve for transferring loads in a radial direction relative to the shaft.

2. The spindle motor of claim 1, further comprising a base to which the shaft is fixedly connected, and a containment plate connected to the hub, the containment plate having a fluid containment surface positioned adjacent to the thrust plate, wherein the liquid hydrodynamic bearing is formed by a lubricating liquid positioned between the thrust plate and hub and also between the thrust plate and the fluid containment surface of the containment plate.

3. The spindle motor of claim 2, wherein the lubricating liquid comprises oil or grease.

4. The spindle motor of claim 2, wherein the hub defines a radial shoulder on which the thrust plate is seated.

5. The spindle motor of claim 4, wherein the thrust plate is captured between the shoulder of the hub and the fluid containment surface of the containment plate.

6. The spindle motor of claim 5, wherein patterns of grooves are formed on one of a) top and bottom surfaces of the thrust plate and b) the containment surface of the containment plate and the shoulder of the hub, for pressurizing the lubricating liquid when the shaft is rotated such that the pressurized liquid provides the liquid hydrodynamic bearing.

7. The spindle motor of claim 1, wherein the hub sleeve is mounted inside the stationary sleeve, and a pattern of grooves is formed on one of an outer surface of the hub sleeve and an inner surface of the stationary sleeve, the pattern of grooves being configured for pressurizing air between the stationary sleeve and the hub sleeve when the hub is rotated, wherein the pressurized air provides the aerodynamic bearing.

8. The spindle motor of claim 7, wherein a magnet is secured to an inside of the hub sleeve, and a stator is secured between the magnet and the shaft.

9. The spindle motor of claim 5, wherein a bearing gap of around 10 microns exists between the thrust plate and the recessed shoulder, and between the thrust plate and the fluid containment surface of the containment plate.

10. The spindle motor of claim 1, wherein a bearing gap of around 2 microns exists between the stationary sleeve and the hub sleeve.

11. The spindle motor of claim 1, wherein the hub sleeve is mounted outside the stationary sleeve, and a pattern of grooves is formed on one of an inner surface of the hub sleeve and an outer surface of the stationary sleeve, the pattern of grooves being configured for pressurizing air between the stationary sleeve and the hub sleeve when the hub is rotated, wherein the pressurized air provides the aerodynamic bearing.

12. The spindle motor of claim 11, wherein a magnet is secured to an outside of the hub sleeve, and a stator is secured outside the magnet.

13. The spindle motor of claim 11, wherein a stator is secured to an inside of the hub sleeve, and a magnet is positioned between the stator and the shaft.

14. The spindle motor of claim 1, wherein the hub is fixedly connected to the shaft, and the motor further includes a containment plate connected to the stationary sleeve, the containment plate having a fluid containment surface positioned adjacent to the thrust plate, wherein the liquid hydrodynamic bearing is formed by a lubricating liquid positioned between the thrust plate and stationary sleeve and also between the thrust plate and the fluid containment surface of the containment plate.

15. The spindle motor of claim 14, wherein the lubricating liquid comprises oil or grease.

16. The spindle motor of claim 14, wherein the stationary sleeve defines a radial shoulder adapted to oppose the thrust plate.

17. The spindle motor of claim 16, wherein the thrust plate is captured between the radial shoulder of the stationary sleeve and the fluid containment surface of the containment plate.

18. The spindle motor of claim 17, wherein patterns of grooves are formed on one of a) top and bottom surfaces of the thrust plate and b) the containment surface of the containment plate and the radial shoulder of the stationary sleeve, for pressurizing the lubricating liquid when the shaft is rotated such that the pressurized liquid provides the liquid hydrodynamic bearing.

19. A spindle motor comprising:
a shaft having an outer circumferential surface;
a thrust plate fixedly connected to the shaft that projects radially outward from the outer circumferential surface of the shaft, the thrust plate having top and bottom surfaces;
a hub assembly mounted on the shaft, the hub assembly being adapted for mounting a storage disc;
a liquid hydrodynamic bearing formed along the top and bottom surfaces of the thrust plate for transferring loads in an axial direction relative to the shaft; and
an aerodynamic bearing formed along a portion of the hub assembly for transferring loads in a radial direction relative to the shaft.

20. The spindle motor of claim 19, further comprising a stationary sleeve positioned inside a hub of the hub assembly, wherein aerodynamic bearing is formed between the stationary sleeve and hub.

21. A data storage device comprising:
a spindle motor including:
a shaft having an outer circumferential surface;
a thrust plate fixedly connected to the shaft that projects radially outward from the outer circumferential surface of the shaft, the thrust plate having top and bottom surfaces;
a hub assembly mounted on the shaft, the rotor structure being adapted for mounting a storage disc;
a liquid hydrodynamic bearing formed along the top and bottom surfaces of the thrust plate for transferring loads in an axial direction relative to the shaft; and
an aerodynamic bearing formed along a portion of the hub assembly for transferring loads in a radial direction relative to the shaft; and
a data storage medium coupled to the rotor structure;
a transducer for reading from and writing to the data storage medium; and
an actuator assembly for moving the transducer relative to the data storage medium.

* * * * *